US012648529B2

(12) United States Patent
Summers

(10) Patent No.: US 12,648,529 B2
(45) Date of Patent: Jun. 9, 2026

(54) ROOT IRRIGATION SPIKE APPARATUS

(71) Applicant: Robert G Summers, Pasadena, CA (US)

(72) Inventor: Robert G Summers, Pasadena, CA (US)

(73) Assignee: Robert G. Summers, Pasadena, CA (US)

( * ) Notice: Subject to any disclaimer, the term of this patent is extended or adjusted under 35 U.S.C. 154(b) by 0 days.

(21) Appl. No.: 18/518,552

(22) Filed: Nov. 23, 2023

(65) Prior Publication Data

US 2024/0164264 A1 May 23, 2024

Related U.S. Application Data

(60) Provisional application No. 63/427,822, filed on Nov. 23, 2022.

(51) Int. Cl.
A01G 29/00 (2006.01)

(52) U.S. Cl.
CPC .................................... A01G 29/00 (2013.01)

(58) Field of Classification Search
CPC ...... A01G 29/00; A01G 9/122; A01G 25/023; A01G 25/06
USPC .......................................... 47/48.5, 57.5, 79
See application file for complete search history.

(56) References Cited

U.S. PATENT DOCUMENTS

| | | | | |
|---|---|---|---|---|
| 708,126 | A | * | 9/1902 | Chase .................... A01G 29/00 294/59 |
| 3,091,197 | A | * | 5/1963 | Henry .................... A01G 29/00 405/51 |
| 3,806,031 | A | | 4/1974 | Olson |
| 3,916,564 | A | * | 11/1975 | Crowell, Sr. .......... A01C 21/00 175/23 |
| 4,058,257 | A | | 11/1977 | Spencer |
| 4,059,228 | A | | 11/1977 | Werner |
| 4,392,616 | A | | 7/1983 | Olson |
| 4,866,880 | A | * | 9/1989 | Weinblatt ............... A01G 29/00 222/650 |
| 5,398,445 | A | * | 3/1995 | Lemons ................. A01G 29/00 47/48.5 |
| 5,694,972 | A | | 12/1997 | King |
| 6,076,300 | A | * | 6/2000 | Cronin ................... A01G 29/00 47/48.5 |
| 6,243,986 | B1 | * | 6/2001 | Crowley ............. A01G 27/006 47/48.5 |

(Continued)

FOREIGN PATENT DOCUMENTS

| | | |
|---|---|---|
| AU | 201900325 A4 | 5/2019 |
| CN | 213695140 U | 7/2021 |

(Continued)

OTHER PUBLICATIONS

CN-216088084-U (Year: 2020).*

(Continued)

*Primary Examiner* — Joshua J Michener
*Assistant Examiner* — Nicole Paige Maccrate
(74) *Attorney, Agent, or Firm* — Cook Alex Ltd.

(57) ABSTRACT

A root irrigation spike apparatus includes a central body, a chamber traversing the central body, an irrigation post communicably coupled to the chamber having at least one irrigation aperture, and a self-piercing needle portion communicably coupled to the chamber having a tapered diameter.

22 Claims, 17 Drawing Sheets

(56) References Cited

U.S. PATENT DOCUMENTS

| | | | | |
|---|---|---|---|---|
| 6,367,197 | B1 * | 4/2002 | Saye | A01G 29/00 |
| | | | | 47/48.5 |
| 6,601,339 | B1 * | 8/2003 | Parker | A01G 27/006 |
| | | | | 47/48.5 |
| 9,587,778 | B2 | 3/2017 | Nourian | |
| 10,091,955 | B2 | 10/2018 | Crook | |
| 2004/0089738 | A1 * | 5/2004 | Heren | B05B 15/622 |
| | | | | 239/271 |
| 2010/0252127 | A1 * | 10/2010 | Gross | A01G 25/023 |
| | | | | 137/562 |
| 2014/0283445 | A1 * | 9/2014 | Chabot | A01G 29/00 |
| | | | | 47/48.5 |
| 2015/0181820 | A1 * | 7/2015 | Crook | A01G 29/00 |
| | | | | 47/48.5 |
| 2016/0286745 | A1 * | 10/2016 | Riffe | A01G 29/00 |
| 2017/0021486 | A1 * | 1/2017 | Reissmann | B25G 3/26 |
| 2017/0205013 | A1 * | 7/2017 | Smith | F16L 41/065 |
| 2017/0332566 | A1 | 11/2017 | Emory | |
| 2020/0113146 | A1 * | 4/2020 | Auguste | A01G 29/00 |

FOREIGN PATENT DOCUMENTS

| | | | | | |
|---|---|---|---|---|---|
| CN | 216088084 | U | * | 3/2022 | |
| CN | 216362955 | U | | 4/2022 | |
| CN | 220936048 | U | | 5/2024 | |
| CN | 118542218 | A | | 8/2024 | |
| FR | 2722646 | A1 | * | 1/1996 | A01G 25/023 |
| WO | WO-2016156814 | A1 | * | 10/2016 | A01G 25/02 |
| WO | WO-2020019013 | A1 | * | 1/2020 | |

OTHER PUBLICATIONS

FR-2722646-A1 (Year: 1996).*

Grow with Deep Drip Watering Stakes Brochure downloaded from http://www.deepdrip.com/wp-content/uploads/2015/01Quick-Reference-Sheet.pdf on Jul. 27, 2025. Foregoing link and PDF available on Wayback Machine as of May 3, 2017 (see https://web.archive.org/web/20170503031551/http://www.deepdrip.com/wp-content/uploads/2015/01/Quick-Reference-Sheet.pdf).

Deep Drip Watering Stakes Installation Instructions Brochure downloaded from http://www.deepdrip.com:80/wp-content/uploads/2014/05/DD-install-instructions-v1.pdf on Jul. 27, 2025. Foregoing link and PDF available on Wayback Machine as of Sep. 26, 2020 (see https://web.archive.org/web/20200926142403/http://www.deepdrip.com:80/wp-content/uploads/2014/05/DD-install-instructions-v1.pdf).

* cited by examiner

100

106

110

ROOT IRRIGATION SPIKE APPARATUS

CROSS REFERENCE TO RELATED APPLICATION

This application claims the benefit of U.S. Provisional Application Ser. No. 63/427,822, filed Nov. 23, 2022, the entirety of which is incorporated by reference herein.

BACKGROUND OF THE INVENTION

Technical Field

Aspects of embodiments of the present disclosure relate to the field of water irrigation and, more particularly, to subterraneous irrigation of plants, trees, shrubs, and other items that demand water.

Problems that are to be Solved by the Invention

Drip irrigation may offer improvements over other irrigation methods by reducing inefficiencies created by spraying water over a large surface area. These benefits may be further enhanced when a drip irrigation system is configured to deliver water in a subterraneous (i.e., underground or sub-surface) manner directly to the soil surrounding a plant's root. However, such subterraneous delivery systems can be difficult to install and/or integrate into an existing drip irrigation system. Therefore, there is a need for a solution that may allow for installation of subterraneous-delivery drip irrigation apparatus that decreases the need for specialized tools, reduces labor required for installation, and can be configured to work with any flexible polyethylene (or other polymer) or rubber irrigation lines. Moreover, there is a need for a subterraneous irrigation system that may be utilized with different irrigation line compositions and sizes/thicknesses.

Means for Solving the Problem

Aspects of embodiments of the present disclosure may alleviate this need by providing a root irrigation spike apparatus that may be connected to a flexible polymer or rubber drip irrigation line via a self-piercing needle portion that allows a user to install a targeted subterraneous drip irrigation spike apparatus at a precise location and depth. Other aspects of embodiments of the present disclosure may be directed to a root irrigation spike apparatus having one or more posts configured to deliver water at varying depths beneath the surface of the soil while also retaining the position of the apparatus after installation. Still other aspects of embodiments of the present disclosure may be directed to a modular root irrigation spike apparatus that may be selectively assembled using components that meet specific user needs.

Effect of the Invention

Aspects of embodiments of the present disclosure may increase the efficiency of a drip irrigation system by delivering water beneath the soil's surface and directly to the soil surrounding a plant's roots thereby preventing water loss due to evaporation and runoff. Moreover, aspects of embodiments of the present disclosure may also reduce installation times and costs by providing a root irrigation spike apparatus that may be installed without the need for specialized tools and other equipment intended to retain the apparatus in place after installation.

SUMMARY OF THE INVENTION

One or more embodiments of the present disclosure may be directed to a root irrigation spike apparatus.

A root irrigation spike apparatus includes a central body, a chamber traversing the central body, an irrigation post communicably coupled to the chamber having at least one irrigation aperture, and a self-piercing needle portion communicably coupled to the chamber having a tapered diameter.

The root irrigation spike apparatus may have a stabilizing post.

The root irrigation spike apparatus may have a line retainer.

The root irrigation spike apparatus may have the irrigation post further include a pointed tip.

The root irrigation spike apparatus may have the central body include a threaded portion configured to mate to a lid.

The root irrigation spike apparatus may have the lid include a grip enhancer.

The root irrigation spike apparatus may have the self-piercing needle portion include a retention shoulder.

The root irrigation spike apparatus may have the irrigation post further include a stabilizer wing.

The root irrigation spike apparatus may have the irrigation post configured with a broadened geometry.

A modular root irrigation spike apparatus includes a central body having a plurality of attachment points, a chamber traversing the central body, a modular irrigation post having at least one irrigation aperture and configured to be coupled to the lower portion of the central body at one of the plurality of attachment points and thereby communicably link to the chamber, and a modular self-piercing needle portion configured to be coupled to the lower portion of the central body at one of the plurality of attachment points and thereby communicably link to the chamber.

The modular root irrigation spike apparatus may have the modular irrigation post include a connector configured to couple to one of the plurality of attachment points.

The modular root irrigation spike apparatus may have the modular irrigation self-piercing needle portion include a connector configured to couple to one of the plurality of attachment points.

The modular root irrigation spike apparatus may have a modular stabilizing post that includes a connector configured to couple to one of the plurality of attachment points.

The modular root irrigation spike apparatus may have the modular self-piercing needle portion include a retention shoulder.

The modular root irrigation spike apparatus may have the modular irrigation post include a stabilizer wing.

The modular root irrigation spike apparatus may include a lid.

The modular root irrigation spike apparatus may have an emitter configured to be retained within and close the irrigation aperture.

A method for installing a root irrigation spike apparatus includes selecting, along an irrigation line, an installation location, piercing, using a self-piercing needle portion, the irrigation line, securing, using a line retainer, the irrigation line between an irrigation post and a stabilizing post of the root irrigation spike apparatus, and applying, by a user, a downward force to a lid on the root irrigation spike apparatus sufficient to drive the irrigation post and the stabilizer post into a subsurface volume of the installation location.

The method for installing a root irrigation spike apparatus may include placing, by the user, an emitter within an irrigation aperture of the irrigation post.

The method for installing a root irrigation spike apparatus may have the lid of the root irrigation spike apparatus include a flattened upper surface.

BRIEF DESCRIPTION

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 1:
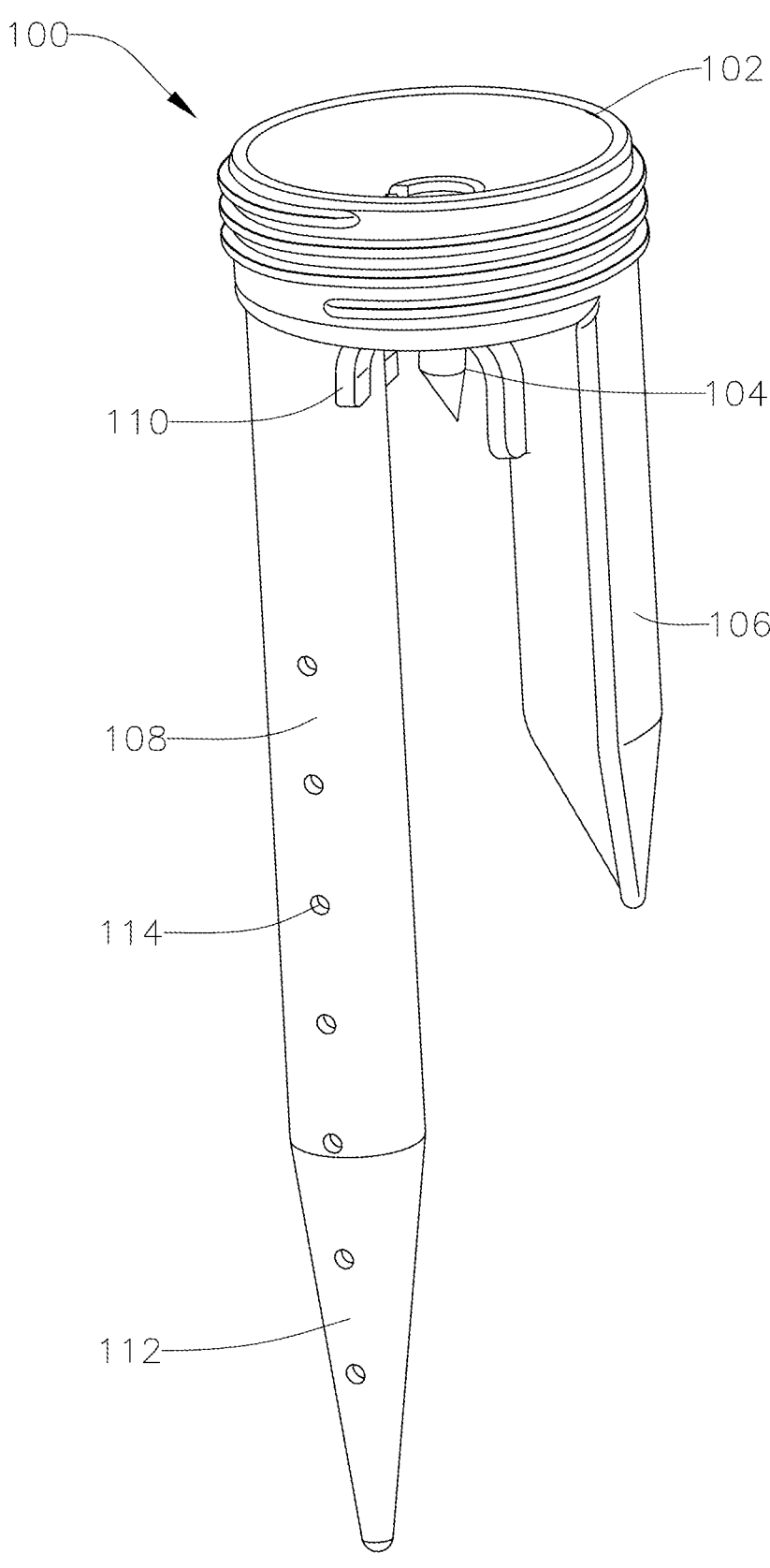
FIG. 1 is a perspective view of a root irrigation spike apparatus, according to some aspects of embodiments of the present disclosure.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer, or section. Thus, a first element, component, region, layer, or section described below could be termed a second element, component, region, layer, or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

One or more embodiments according to the present disclosure will now be described.

I. Root Irrigation Spike Apparatus

FIG. 1 is a perspective view of a root irrigation spike apparatus 100, according to some aspects of embodiments of the present disclosure. As depicted, some embodiments of the root irrigation spike apparatus 100 of the present disclosure may include a central body 102. In some embodiments, the central body 102 may surround or otherwise include a chamber (118 of FIG. 2) or cavity within the interior of the central body 102. The central body 102 may, in some embodiments, be coupled to a self-piercing needle portion 104, a stabilizing post 106 (also referred to herein as a "retention post"), an irrigation post 108, and any combination thereof. As depicted, some embodiments may include a line retainer 110 that may provide a friction fit for the root irrigation spike apparatus 100 against an irrigation line (not depicted). The irrigation post 108 may, in some embodiments, include one or more irrigation apertures 114. The irrigation post 108 may also, in some embodiments, include a pointed tip 112 or end portion configured to ease the installation of the irrigation post 108 into soil.

Figure 2:
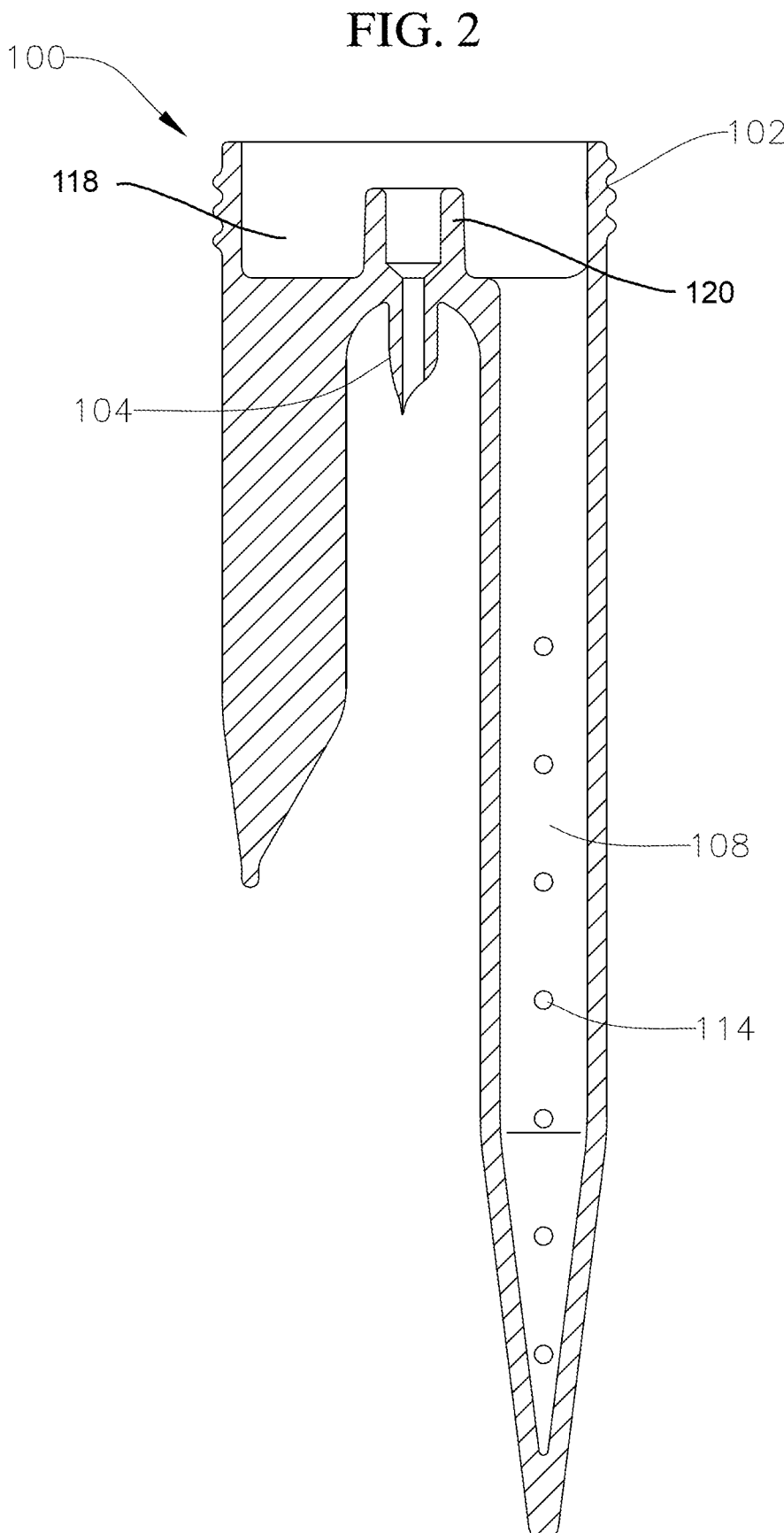
FIG. 2 is a cross-sectional view of a root irrigation spike apparatus, according to some aspects of embodiments of the present disclosure.

FIG. 2 is a cross-sectional view of a root irrigation spike apparatus 100, according to some aspects of embodiments of the present disclosure. Here, one embodiment's positioning of the irrigation post 108, the central body 102, and the self-piercing needle portion 104 can be seen. As depicted, the central body 102 may form a chamber 118 that is communicably linked to the lumen of the self-piercing needle portion 104 and the irrigation post 108. Inlet 120 extends from a bottom surface of the chamber 118 upward about the opening of the lumen of the self-piercing needle portion 104.

Figure 3:
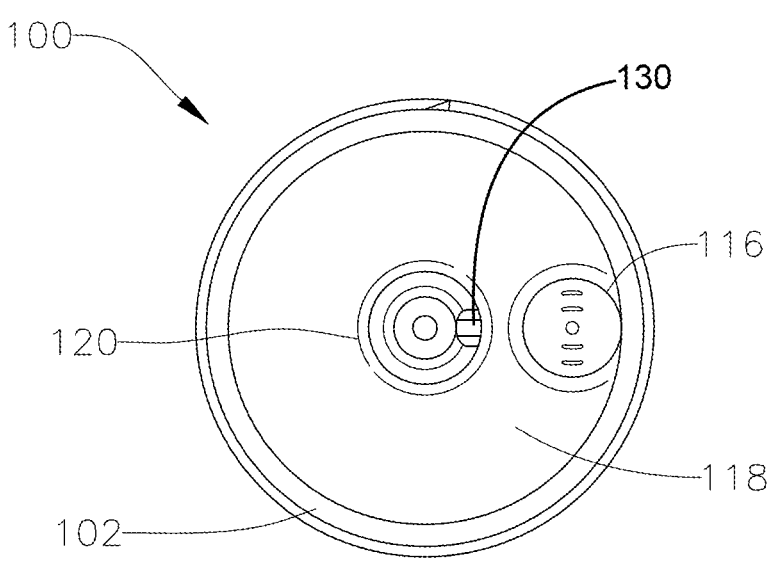
FIG. 3 is a top-down view of a root irrigation spike apparatus, according to some aspects of embodiments of the present disclosure.

FIG. 3 is a top-down view of a root irrigation spike apparatus 100, according to some aspects of embodiments of the present disclosure. As shown, some embodiments of the central body 102 may be circular or round in shape. Within the central body 102 may be formed the chamber 118. The chamber 118 may, in some embodiments, be communicably linked to an opening for the irrigation post 116 and the lumen of the self-piercing needle portion by the inlet 120. As depicted, in some embodiments, the inlet 120 may include a slot 130.

Figure 4:
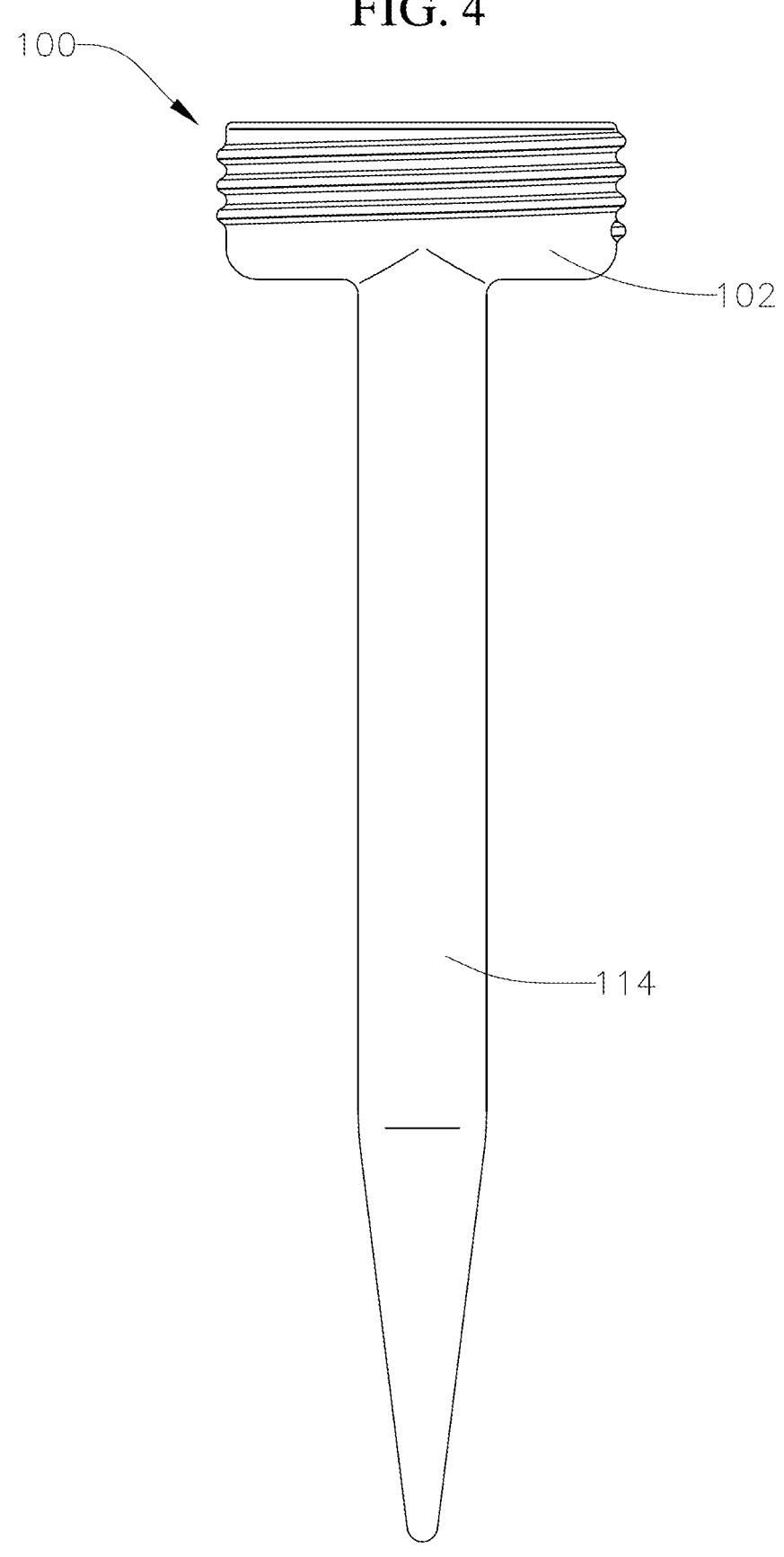
FIG. 4 is a lateral view of a root irrigation spike apparatus, according to some aspects of embodiments of the present disclosure.

FIG. 4 is a lateral view of a root irrigation spike apparatus 100, according to some aspects of embodiments of the present disclosure. As depicted, the central body 102 may, in some embodiments, be coupled to or otherwise attached to the irrigation post 108. Also depicted is a threaded portion along an outer surface of the central body 102.

Figure 5:
FIG. 5 is a frontal view of a root irrigation spike apparatus, according to some aspects of embodiments of the present disclosure.

FIG. 5 is a frontal view of a root irrigation spike apparatus 100, according to some aspects of embodiments of the present disclosure. As shown, the stabilizing post 106 may, in some embodiments, have a lateral surface that is continuous with an outer edge of the central body 102. However, in some other embodiments, this relative positioning may be changed. The irrigation apertures 114, in some embodiments, may be located along any portion of the irrigation post 108.

Those features provided above will now be described in greater detail.

A. Central Body

The central body 102 may, in some embodiments, be formed from a plastic or polymer material. As a non-limiting example, the central body 102 may, in some embodiments, be formed from ferrous materials like iron, other metals or metal allows like aluminum, copper, or titanium, polymers and plastics such as PVC or ABS, and any other materials as would be known by one skilled in the art to be suitable for irrigation purposes.

The central body 102 may, in some embodiments, have a round or circular perimeter (as depicted in FIG. 1). The use of a circular perimeter geometry may, in some such embodiments, allow for threads to be placed along an outer surface of the central body 102. Such threads may, in some embodiments, be used to secure a lid (124 of FIG. 6) or other components to the central body 102. Some other embodiments may use other suitable perimeter geometries including, but not limited to, rectangular shapes, square shapes, other polygonal shapes, and ovoid shapes.

1. Chamber

Some embodiments of the central body 102 may include a chamber 118 or cavity within the interior volume of the central body 102. As will be understood by one skilled in the art, any suitable shape of the chamber 118 may be used within the scope of the present disclosure. As a non-limiting example, the chamber 118 may, in some embodiments, follow the general shape of the central body 102. The chamber 118 may, in some embodiments, be configured to allow for the continuous flow of incoming fluid from the lumen of the self-piercing needle portion 104, that is communicably linked to the chamber 118, to the irrigation apertures of the irrigation post 108. Such a configuration may, in such embodiments, allow for the flow of fluid from a pierced irrigation line (not depicted) into the root irrigation spike apparatus 100 and then the delivery of fluid into the surrounding sub-surface soil through the irrigation apertures 114.

As depicted in FIG. 2, in some embodiments, the inlet 120 may extend inward into the volume of the chamber 118 and surround or encircle the lumen of the self-piercing needle portion 104. As shown, in some embodiments, the inlet 120 may form a rim around the self-piercing needle portion 104.

As shown in FIG. 3, in some embodiments, the inlet 120 may include a slot 130 that extends upward within an inner surface of the inlet 120. In some other embodiments, one or more slots 130 may be included. As depicted, in some embodiments, the slot 130 may extend upward to the edge of the inlet 120. In some other embodiments, the slot 130 may begin partway down along the inner surface of the inlet 120, i.e., the slot 130 may only extent partially down towards the lumen of the self-piercing needle portion 104 along the inner surface of the inlet 120.

2. Threaded Portion

As depicted in FIG. 5, some embodiments of the central body 102 may have a circular perimeter geometry. Some such embodiments may include threads along an outer surface of the central body 102 to allow for a lid 124 or other components to be secured to the central body 102. As will be appreciated by one skilled in the art, there may be other structures that may serve as alternatives to threads, including but not limited to bayonet-type locks, ribs, grooves, and other friction-fit type structures. In some other embodiments, one or magnets (not depicted) may be fitted into the central body 102 to facilitate a magnetic coupling to a lid 124 or other component.

B. Irrigation Post

In use, some embodiments of the root irrigation spike apparatus 100 of the present disclosure may facilitate the subterraneous delivery of fluid to the root structure of a plant, tree, or lawn. Such subterraneous fluid delivery may, in some embodiments, be performed using the irrigation post 108. The irrigation post 108 may, in some embodiments, be communicably linked to the chamber 118 such that fluid may flow into the irrigation post 108 from the chamber 118 and be delivered to the surrounding area of soil through the irrigation apertures 114.

As will be appreciated by one skilled in the art, the irrigation post 108 may, in some embodiments, be formed from or otherwise constructed from the same or similar materials as the central body 102. However, the use of different materials from the central body 102 is within the scope of the present disclosure and any suitable materials as would be known to one skilled in the art for the purpose of irrigation may be used to form or otherwise construct the irrigation post 108.

1. Irrigation Apertures

In some embodiments, the irrigation post 108 may include one or more irrigation apertures 114. The irrigation apertures 114 may, in some such embodiments, allow for fluid to flow from the interior of the irrigation post 108 into the surrounding soil.

As will be appreciated by one skilled in the art, the size and shape of the irrigation apertures may be varied according to user need. As a non-limiting example, round apertures having a diameter of 1 cm may be used. Any suitable number and arrangement of the irrigation apertures 114 may also be used within the scope of the present disclosures.

2. Pointed Tip

As depicted in FIG. 1, some embodiments of the irrigation post 108 may include a pointed tip 112 or end portion. The pointed tip 112 may, in some such embodiments, facilitate easier installation of the irrigation post 108 into soil by helping to displace the soil progressively as the irrigation post 108 is pushed downward.

As will be appreciated by one skilled in the art, the pointed tip 112 may, in some embodiments, be formed from or otherwise constructed from the same or similar materials as the irrigation post 108. However, the use of different materials from the irrigation post 108 is within the scope of the present disclosure and any suitable materials as would be known to one skilled in the art for the purpose of irrigation may be used to form or otherwise construct the pointed tip 112.

3. Emitter

In some embodiments, an emitter (not depicted) may be used to selectively close one or more of the irrigation apertures 114. As will be understood by one skilled in the art, the emitters may, in some embodiments, include on or more portions configured to be retained within and close or otherwise fill the opening of an irrigation aperture 114. The use of an emitter may, in some embodiments, allow a user to selectively control the direction and/or depth of the fluid delivered by the irrigation apertures 114.

C. Self-Piercing Needle Portion

Some embodiments of the root irrigation spike apparatus 100 of the present disclosure are directed to use in connection with a flexible polymer (e.g., polyethylene, vinyl, etc.) or rubber irrigation line. In such embodiments, a self-piercing needle portion 104 may be used to communicably couple the root irrigation spike apparatus 100 to the irrigation line. The self-piercing needle portion 104 may, in some embodiments include a portion having a tapered diameter and/or a pointed insertion tip. In some embodiments, the portion having a tapered diameter may also form a retention shoulder. The retention shoulder may, in some embodiments, prevent the self-piercing needle portion 104 from pulling back out of the irrigation line after it has been inserted.

Some embodiments of the self-piercing needle portion 104 include a lumen that may for a continuous path for the flow of water from the interior of the irrigation line up through the self-piercing needle portion 104 and into the chamber 118. In some other embodiments, the opening formed by the lumen of the self-piercing needle portion 120, i.e., the inlet 120, may include a backflow valve (not depicted) or other structures to prevent the flow of water from the chamber 118 back into the irrigation line. As will be discussed in more detail below, the inlet 120 may also include other structures that may be configured to allow for a user to vary the flow rate of fluid into the chamber through the inlet 120 as the fluid flows from the irrigation line through the lumen into the chamber 118.

As will be appreciated by one skilled in the art, the self-piercing needle portion 104 may, in some embodiments, be formed from or otherwise constructed from the same or similar materials as the central body 102. However, the use of different materials from the central body 102 is within the scope of the present disclosure and any suitable materials as would be known to one skilled in the art for the purpose of irrigation may be used to form or otherwise construct the self-piercing needle portion 104.

The self-piercing needle portion 104 may have a portion having a tapered diameter forming an insertion tip. In some such embodiments, the insertion tip may have a sharp point or a sharp edge. However, as will be appreciated by one skilled in the art, variations in the size and geometry of the self-piercing needle portion 104 may be used, and any suitable size and geometry may be used within the scope of the present disclosure. Likewise, variations in the size and geometry of the lumen are within the scope of the present disclosure, and any suitable size and geometry as would be known to one skilled in the art may be used within the scope of the present disclosure.

Figure 17:
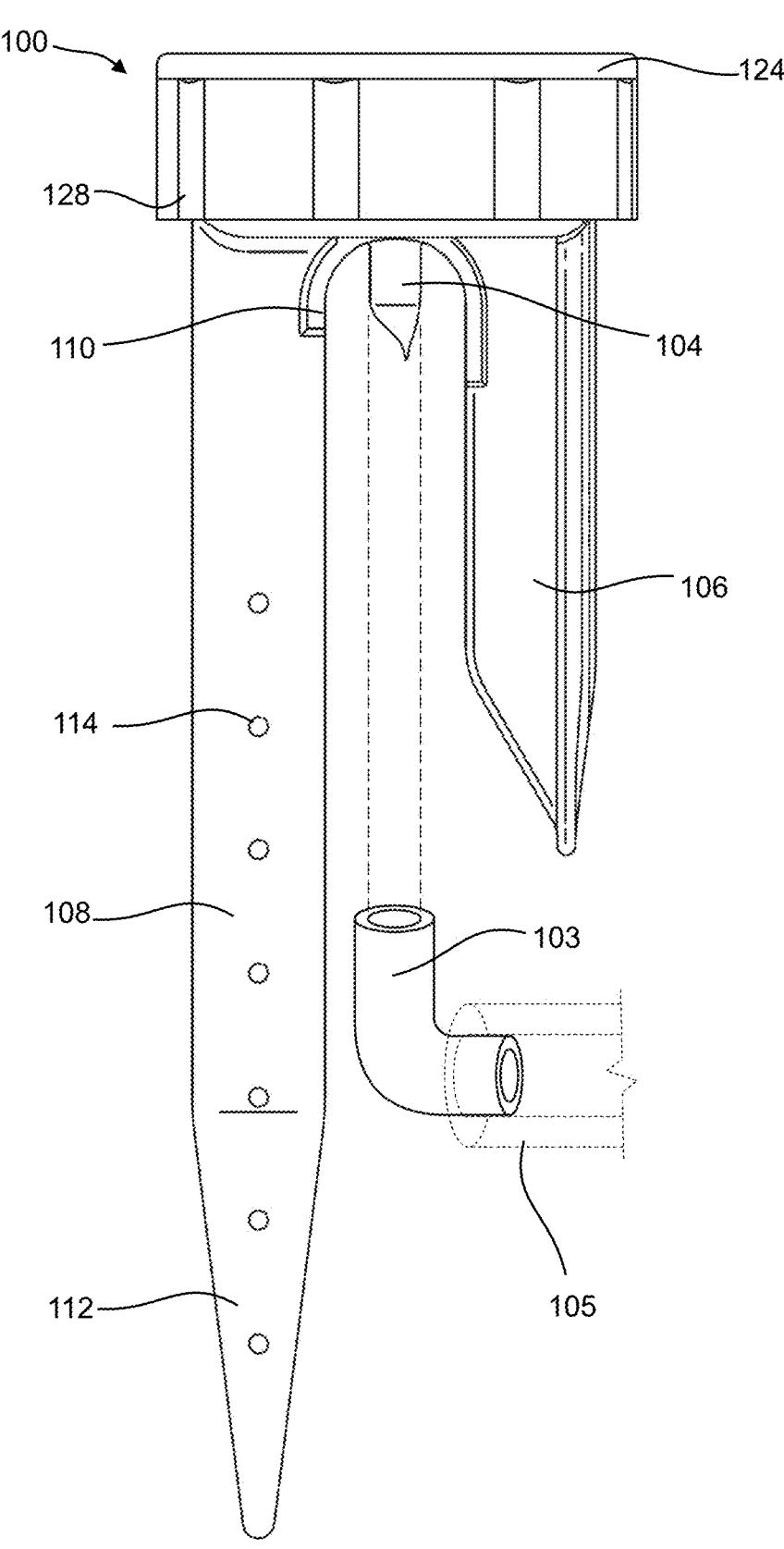
FIG. 17 is a front view of a root irrigation spike apparatus of FIG. showing a fitting that at one end may connect to the root irrigation spike apparatus and at another end may connect to an irrigation line.

In some embodiments, the self-piercing needle portion may be coupled to, or enclosed by, a first end of a 90° fitting (FIG. 17). As will be appreciated by one skilled in the art, the 90° fitting may, in some embodiments, be a suitably sized "L" shaped fitting. In some such embodiments, the first end of the 90° fitting can be coupled to or otherwise secured over at least a portion of the self-piercing needle portion. A second end of the 90° fitting may then, in some embodiments, be interfaced or otherwise connected to an open end of an irrigation line.

D. Stabilizing Post

In some embodiments of the root irrigation spike apparatus 100 of the present disclosure, a stabilizing post 106 may be used. The stabilizing post 106 may, in some embodiments, be positioned below the central body 102 and opposite the irrigation post 108. However, in some other embodiments, the stabilizing post 106 may be located in any suitable position beneath the central body 102 that facilitates its placement within the sub-surface soil during and after installation. In some embodiments, an outer surface of the stabilizing post 106 may form a continuous surface with the outer perimeter of the central body 102. However, this is not required and other configuration that do not form a continuous surface are contemplated within the scope of the present disclosure.

The stabilizing post 106 may, in some embodiments, have a blade-like, trowel-like, or shovel like geometry. In some other embodiments, the stabilizing post 106 may have one or more flat portions that may be positioned relative to one another at an angle to form various geometries. As a non-limiting example, this may include "X-shaped," "T-shaped," "V-shaped," "Y-shaped" geometries, and variations thereof. In some other embodiments, the stabilizing post 106 may include a blade-like or pointed lower portion to facilitate ease of installation.

The stabilizing post 106 may, in some embodiments, provide a surface of the root irrigation spike apparatus 100 that may be in contact with the surrounding sub-surface soil after installation that may counter or otherwise resist movements such as tipping, twisting, or shifting of the installed apparatus.

As will be appreciated by one skilled in the art, the stabilizing post 106 may, in some embodiments, be formed from or otherwise constructed from the same or similar materials as the central body 102. However, the use of different materials from the central body 102 is within the scope of the present disclosure and any suitable materials as would be known to one skilled in the art for the purpose of irrigation may be used to form or otherwise construct the stabilizing post 106.

E. Line Retainer

During use, some embodiments of the root irrigation spike apparatus 100 of the present disclosure may be connected to a flexible polymer or rubber irrigation line. A line retainer 110 may thus be included in some embodiments to help create a more secure, friction-fit coupling of the root irrigation spike apparatus 100 to the irrigation line. In some embodiments, the line retainer 110 may be formed by one or more protrusions molded out from, or coupled to, the irrigation post 108, the central body 102, or the stabilizing post 106, or any combination thereof. In some other embodiments, the line retainer 110 may be an options component that may be coupled to the lower surface of the central body 102. As depicted in FIG. 1, in some embodiments, the line retainer 110 may include one or more protrusions from the irrigation post 108 and the stabilizing post 106 in a configuration that allows for the irrigation line to squeeze past at least some of the protrusions but then have a friction-fit within the line retainer 110.

F. Lid and Flow Control Post

Figure 6:
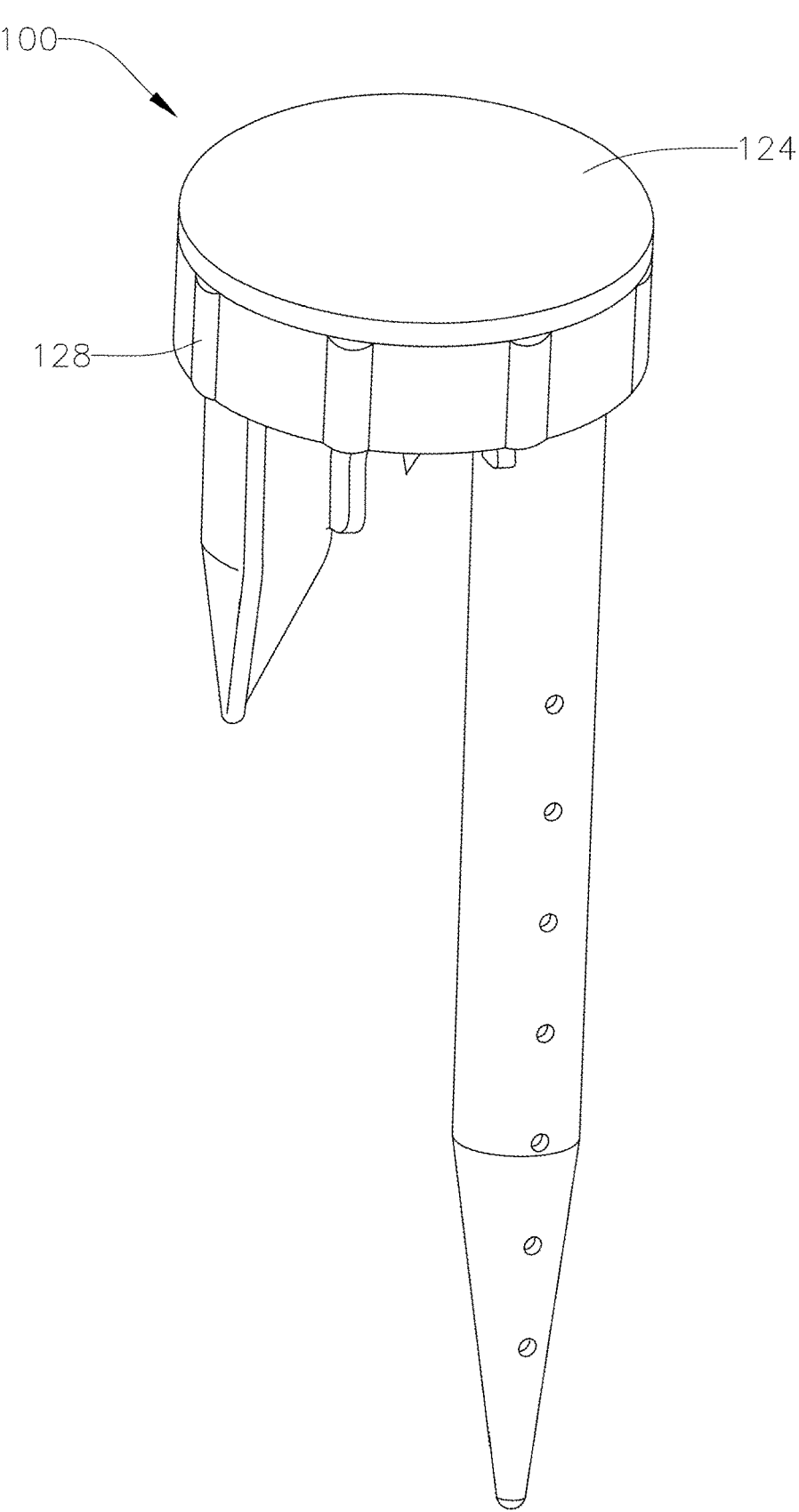
FIG. 6 is a perspective view of a root irrigation spike apparatus with a lid, according to some aspects of embodiments of the present disclosure.

FIG. 6 is a perspective view of a root irrigation spike apparatus 100 with a lid 124, according to some aspects of embodiments of the present disclosure. As depicted, some embodiments of the lid may include a grip enhancer 128 formed by one or more surface features about the perimeter surface of the lid 124.

In some embodiments, the root irrigation spike apparatus 100 of the present disclosure may include a lid 124 configured to couple to the central body 102. In some embodiments, where the central body 102 has a round or circular perimeter shape, the lid 124 may have a similar perimeter shape sized accordingly to couple with the central body 102. As will be appreciated by one skilled in the art, various shapes and sizes of the lid 124 may be used within the scope of the present disclosure, and any size and shape of the lid 124 suitable for coupling to the central body 102 may be used. In embodiments of the central body 102 having threads or other locking structures to help retain the lid 124, some embodiments of the lid 124 may include corresponding retaining features configured to mate with or interface with the locking structures of the central body 102. In some embodiments, the lid 124 may include a rubber gasket (not depicted) configured to help prevent fluid flow out from the chamber 118 when the lid 124 is coupled to the central body 102.

As will be appreciated by one skilled in the art, the lid 124 may, in some embodiments, be formed from or otherwise constructed from the same or similar materials as the central body 102. However, the use of different materials from the central body 102 is within the scope of the present disclosure and any suitable materials as would be known to one skilled in the art for the purpose of irrigation may be used to form or otherwise construct the lid 124.

Figure 15:
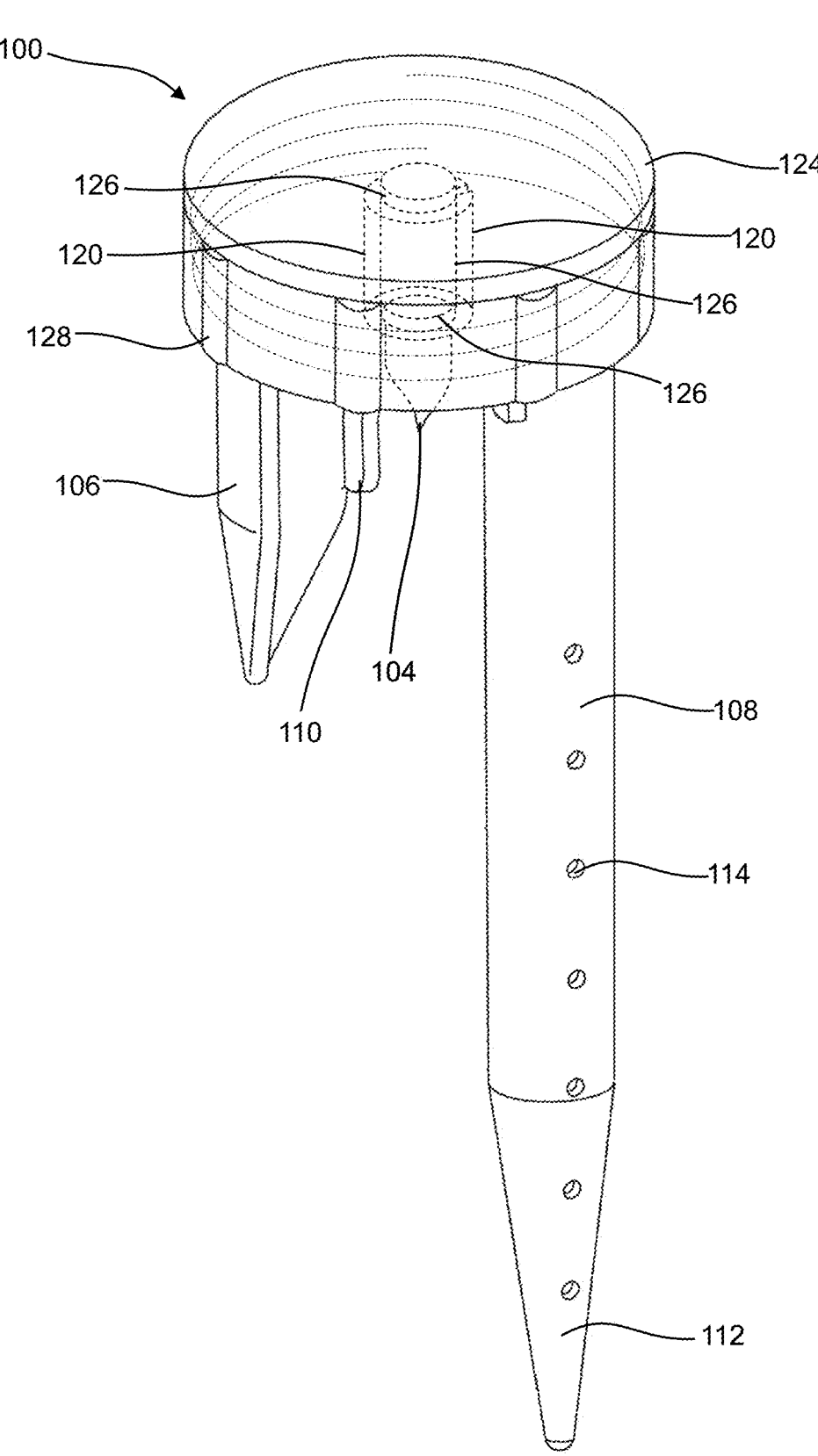
FIG. 15 is a perspective view of a root irrigation spike apparatus of FIG. 6 showing select features that include a flow control post, in dotted line, according to some aspects of embodiments of the present disclosure.

In some embodiments, the lid 124 may include a flow control post (FIG. 15) that may be coupled to an inner surface of the lid 124. In some such embodiments, the flow control post may extend downward from the lid 124 and be positioned and configured such that a distal end of the flow control post interfaces, i.e., couples closely along a surface, with inlet 120 and/or the inlet 120 and the slot 130. In some other embodiments, the distal end of the flow control post may interface with the inlet 120 and one or more slots 130.

In some other embodiments, the distal end of the flow control post may include a rubberized tip or a rubberized gasket.

When the lid 124 is rotated about the central body 102, in some embodiments, one or more threads that interface between the lid 124 and the outer surface of the central body 102 may raise or lower the lid 124 and thus also the distal end of the flow control post and thereby expose or close off the slot 130. As will be understood by one skilled in the art, increasing or decreasing amount of the slot 130 that is exposed within the inlet may, in some embodiments, allow for increased or decreased fluid flow into the chamber 118 up through the inlet 120 and then the slot 130. In some embodiments, the flow control post may be configured to entirely close off fluid flow into the chamber 118 when the lid 124 is entirely screwed closed. In some other embodiments, the flow control post may be configured to provide a range of flow rates according to the rotational displacement of the lid 124 about the central body 102 within its range of motion along the threads.

In some such embodiments, as a non-limiting example, the flow rate may be varied in the range of 1.875 GPH to as much as 3.75 GPH. In some other embodiments, this range may go from 1.0 GPH to 5.0 GPH. As will be appreciated by one skilled in the art, different irrigation use cases may necessitate different flow rates, and the ranges of flow rates provided by the flow control post and or slot may be to any suitable percentage of the total flow rate of fluid within the irrigation line.

1. Grip Enhancer

To facilitate easier twisting or pulling of the lid 124, some embodiments of the lid 124 may include a grip enhancer 128. The grip enhancer 128 may, in some embodiments, include one or more surface features protruding from or extending into the lid 124. As a non-limiting example, these surface features may include bumps, ridges, notches, stippling, knurling, grooves, and/or any other surface features as would be known by one skilled in the art to be suitable for this purpose.

2. Flattened Upper Surface

Some embodiments of the lid 124, may include a flattened upper surface. The flattened upper surface may, in some such embodiments, help a user install the root irrigation spike apparatus 100 by providing a suitable surface for applying a downward pressure on the apparatus to drive it into the soil at the desired installation location.

G. Stabilizer Wing Embodiments

The following disclosures describe embodiments of the root irrigation spike apparatus having one or more stabilizer wings. Such embodiments may include some or all of the previously described features of the root irrigation spike apparatus 100. As such, all of the previously described features are within the scope of the stabilizer wing embodiments described below and, for simplicity, the numbering for the corresponding features will generally move from the 100s to the 200s.

Figure 7:
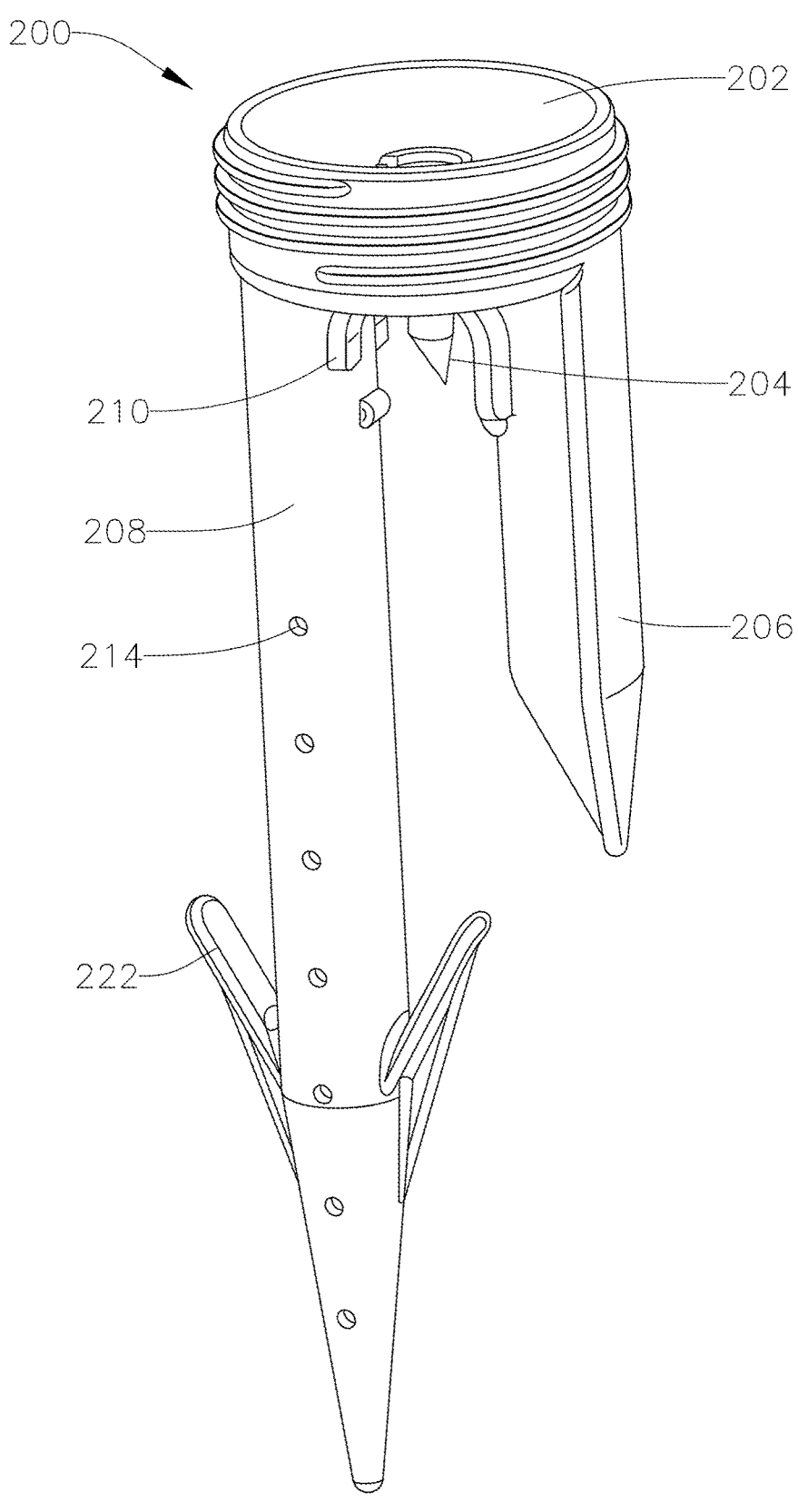
FIG. 7 is a perspective view of a root irrigation spike apparatus having a stabilizer wing, according to some aspects of embodiments of the present disclosure.

FIG. 7 is a perspective view of a root irrigation spike apparatus 200 having a stabilizer wing 222, according to some aspects of embodiments of the present disclosure. As depicted, some embodiments of the root irrigation spike apparatus 200 of the present disclosure may include a central body 202. In some embodiments, the central body 202 may surround or otherwise include a chamber (118 of FIG. 3) or cavity within the interior of the central body 202. The central body 202 may, in some embodiments, be coupled to a self-piercing needle portion 204, a stabilizing post 206 (also referred to herein as a "retention post"), an irrigation post 208, and any combination thereof. As depicted, some embodiments may include a line retainer 210 that may provide a friction fit for the root irrigation spike apparatus 200 against an irrigation line (not depicted). The irrigation post 208 may, in some embodiments, include one or more irrigation apertures 214.

Figure 8:
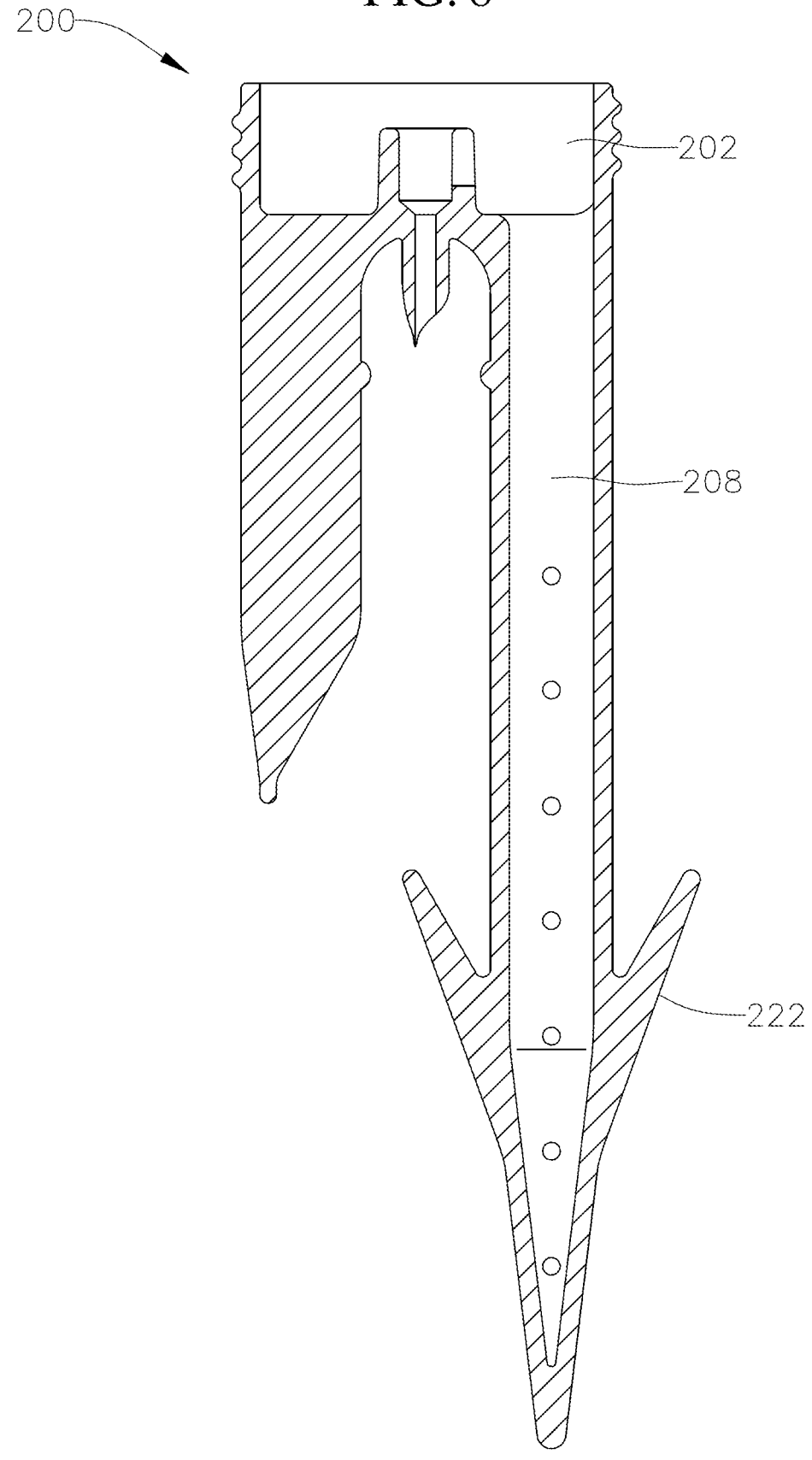
FIG. 8 is a cross-sectional view of a root irrigation spike apparatus having a stabilizer wing, according to some aspects of embodiments of the present disclosure.

FIG. 8 is a cross-sectional view of a root irrigation spike apparatus 200 having a stabilizer wing 222, according to some aspects of embodiments of the present disclosure. Here, one embodiment's positioning of the irrigation post 208, the central body 202, and the self-piercing needle portion 204 can be seen. As depicted, the central body 202 may form a chamber (218 of FIG. 9) that is communicably linked to the lumen of the self-piercing needle portion 204 and the irrigation post 208.

Figure 9:
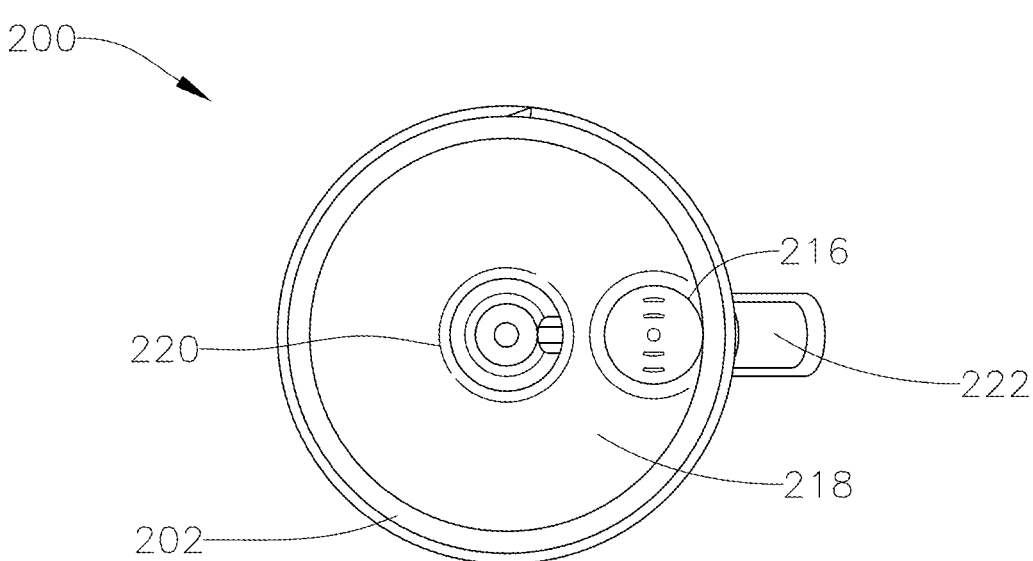
FIG. 9 is a top-down view of a root irrigation spike apparatus having a stabilizer wing, according to some aspects of embodiments of the present disclosure.

FIG. 9 is a top-down view of a root irrigation spike apparatus 200 having a stabilizer wing 222, according to some aspects of embodiments of the present disclosure. As shown, some embodiments of the central body 202 may be circular or round in shape. Within the central body 202 may be formed the chamber 218. The chamber 218 may, in some embodiments, be communicably linked to an opening for the irrigation post 216 and the opening formed by the lumen of the self-piercing needle portion 220.

Figure 10:
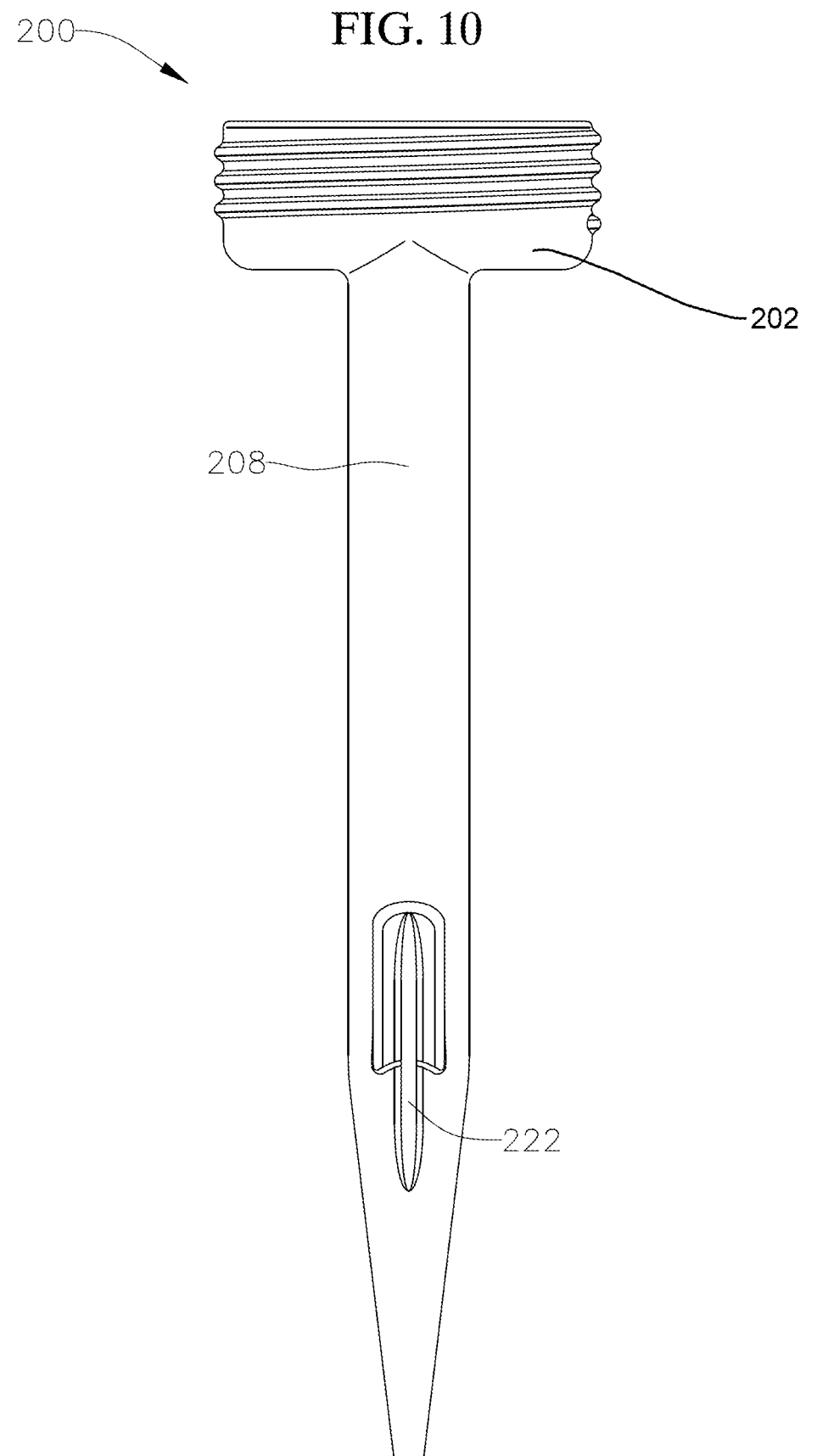
FIG. 10 is a lateral view of a root irrigation spike apparatus having a stabilizer wing, according to some aspects of embodiments of the present disclosure.

FIG. 10 is a lateral view of a root irrigation spike apparatus having a stabilizer wing, according to some aspects of embodiments of the present disclosure. As depicted, the central body 202 may, in some embodiments, be coupled to or otherwise attached to the irrigation post 208. Also depicted is a threaded portion along an outer surface of the central body 202.

Figure 11:
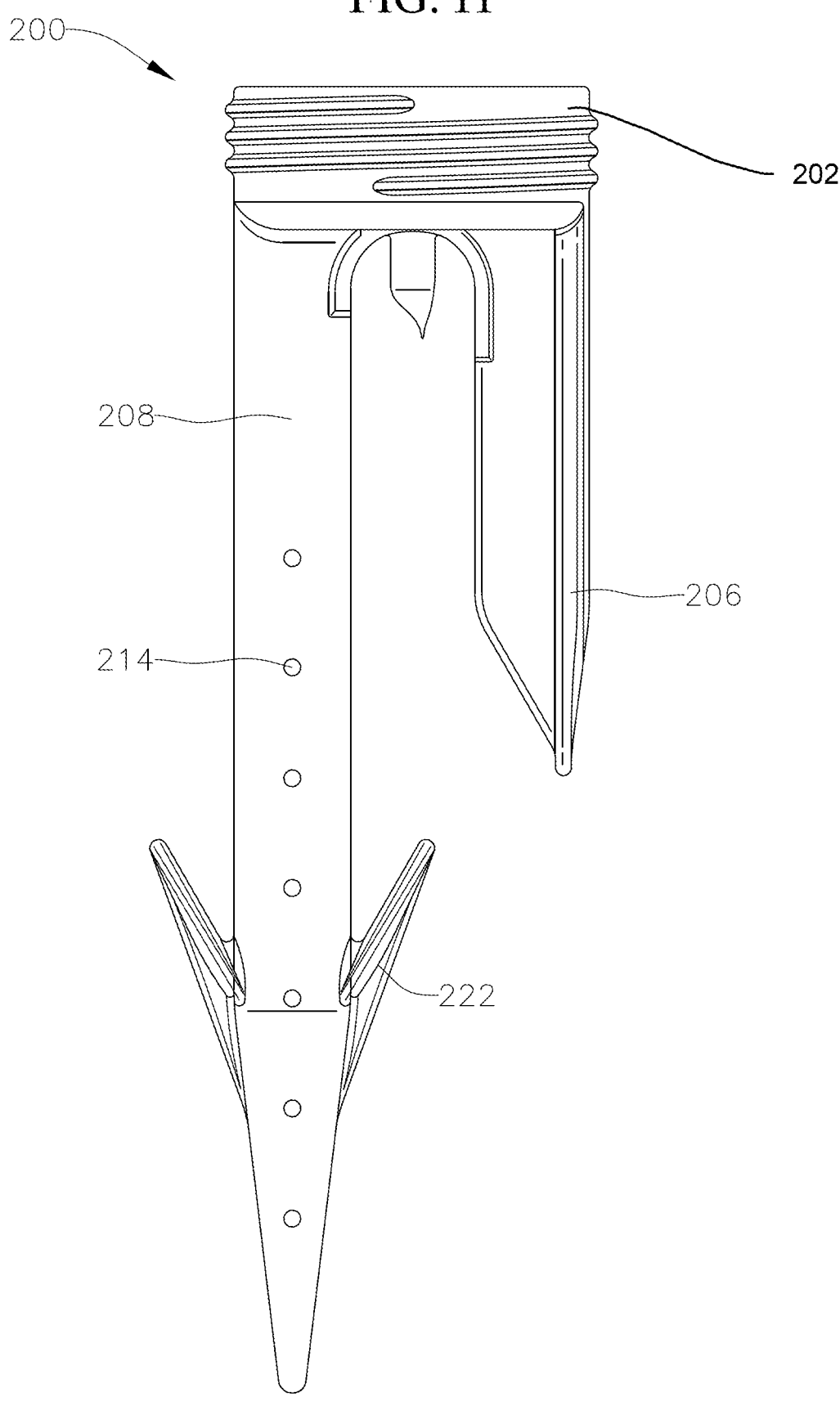
FIG. 11 is a frontal view of a root irrigation spike apparatus having a stabilizer wing, according to some aspects of embodiments of the present disclosure.

FIG. 11 is a frontal view of a root irrigation spike apparatus having a stabilizer wing, according to some aspects of embodiments of the present disclosure. As shown, the stabilizing post 206 may, in some embodiments, have a lateral surface that is continuous with an outer edge of the central body 202. However, in some other embodiments, this relative positioning may be changed. The irrigation apertures 214, in some embodiments, may be located along any portion of the irrigation post 208.

Those features provided above, and not previously described in regard to the root irrigation spike apparatus 100, will now be described in greater detail.

Embodiments of the root irrigation spike apparatus 200 may include one or more stabilizer wings 222. As shown in FIG. 7, the stabilizer wing 222 may include one or more protrusions, extensions, wings, cantilevers, or other structures that extend out from the irrigation post 208. In some embodiments, only a single stabilizer wing 222 may be used. In some other embodiments, two or more stabilizer wings 222 may be used.

The stabilizer wing 222 may, in some embodiments, increase the stability of the root irrigation spike apparatus 200 while installed. In some such embodiments, the stabilizer wing 222 may provide a surface in contact with the surrounding sub-surface soil that serves to resist motion (twisting, pulling, shifting, etc.) while the apparatus is installed.

As will be appreciated by one skilled in the art, the stabilizer wing 222 may, in some embodiments, be formed from or otherwise constructed from the same or similar materials as the irrigation post 208. However, the use of different materials from the irrigation post 208 is within the scope of the present disclosure and any suitable materials as would be known to one skilled in the art for the purpose of irrigation may be used to form or otherwise construct the stabilizer wing 222. Likewise, any suitable size and geometry of the stabilizer wing 222, as would be understood by one skilled in the art to be suitable for increasing the apparatus's resistance to motion while installed, may be used within the scope of the present disclosure. As a non-limiting example, this may include delta shaped wings, rectangular or square wings, round wings, polygonal wings, and any other shape as would be known to be suitable for this purpose by one skilled in the art.

H. Alternative Embodiments

1. Dual Irrigation Post Embodiments

Figure 12:
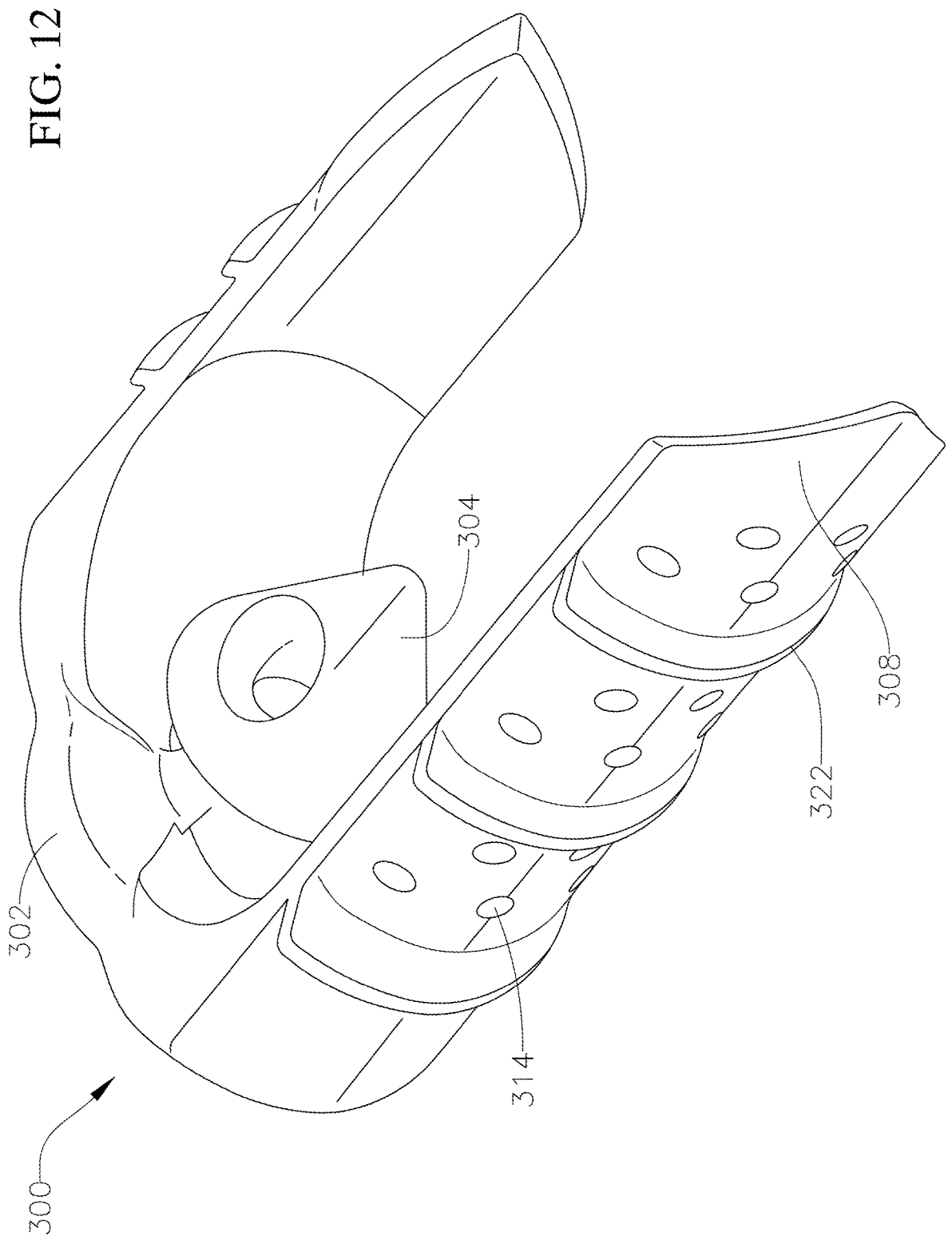
FIG. 12 is a perspective view of a root irrigation spike apparatus having dual irrigation posts, according to some aspects of embodiments of the present disclosure.

FIG. 12 is a perspective view of a dual irrigation post root irrigation spike apparatus 300 having dual irrigation posts 308, according to some aspects of embodiments of the present disclosure. As depicted, some embodiments of the dual irrigation post root irrigation spike apparatus 300 may include a central body 302, a self-piercing needle portion 304, a plurality of irrigation apertures 314, and one or more stabilizer wings 322.

In some embodiments, the dual irrigation posts 308, may be similar to the irrigation post 108 and 208 described above, but include a second irrigation post 108 and 208 rather than a stabilizing post 106 and 206. In some other embodiments, as depicted, the dual irrigation posts 308 may include features of both the previously described irrigation post 208, such as irrigation apertures 314 and stabilizer wings 322, and the stabilizing post 206. A non-limiting example of a feature taken from the stabilizing post 206 described above may be in the geometry of the dual irrigation posts 308 which may, in some embodiments, feature a curved or angled shape to increase the surface area and thus overall stability of the apparatus while installed. As depicted, in some such embodiments, this may include a broader and curved shape for the dual irrigation posts 308.

The dual irrigation post root irrigation spike apparatus 300 is also depicted in FIG. 12 having a self-piercing needle portion 304 having a portion with a tapered diameter and a retention shoulder. As described above, the retention shoulder may, in some embodiments, serve to keep the self-piercing needle portion 304 coupled to the irrigation line after insertion. However, as described above, any suitable size and geometry for the self-piercing needle portion 304 as would be known to one skilled in the art may be used within the scope of the present disclosure.

2. Broadened Geometry Embodiments

Figure 13:
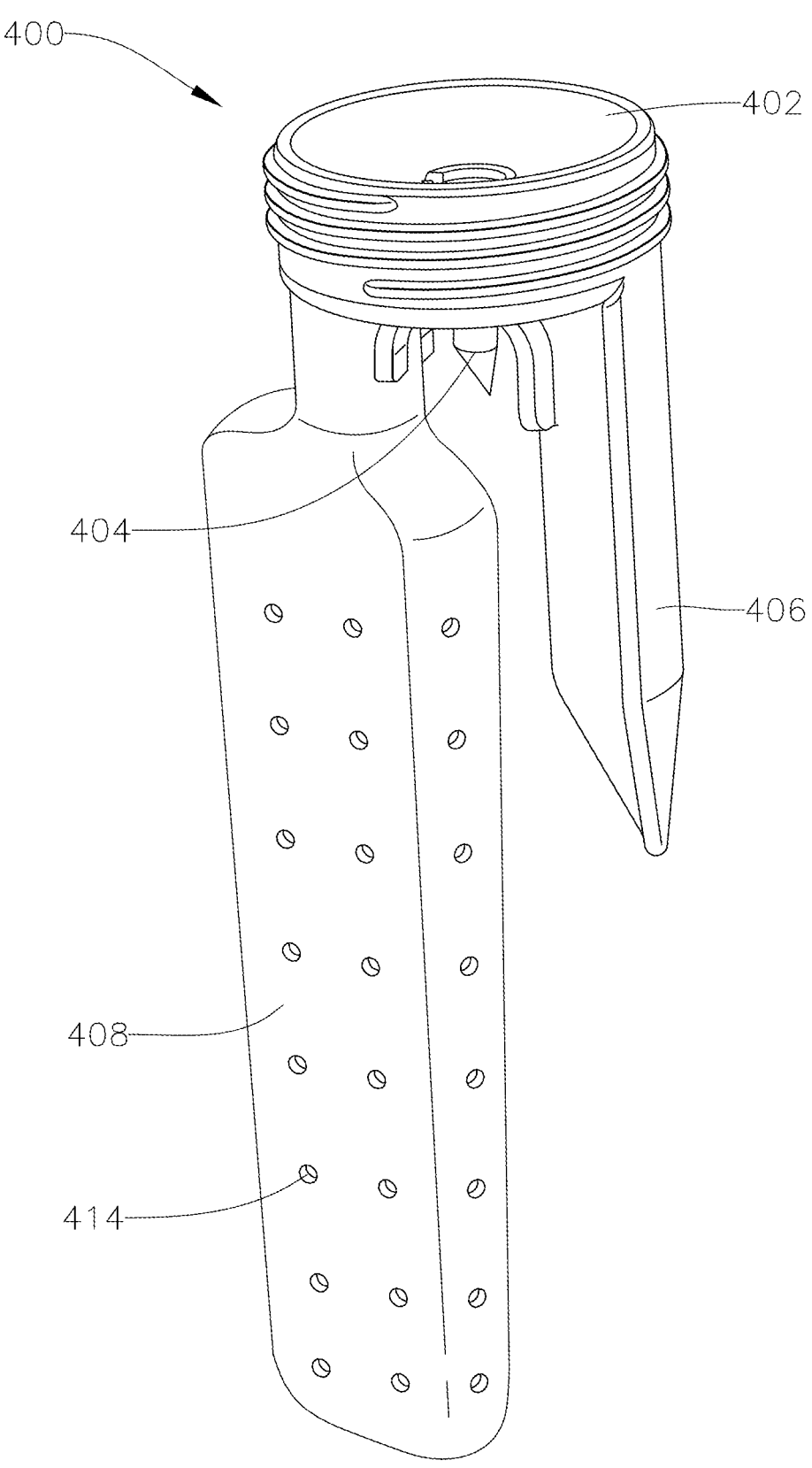
FIG. 13 is a perspective view of a root irrigation spike apparatus having an irrigation post with a broadened geometry, according to some aspects of embodiments of the present disclosure.

FIG. 13 is a perspective view of a broadened root irrigation spike apparatus 400 having an irrigation post 408 with a broadened geometry, according to some aspects of embodiments of the present disclosure.

All of the previously described features of the root irrigation apparatus 208 are applicable to the broadened root irrigation spike apparatus 400. For simplicity, the number used to describe these embodiments will move from the 100s to the 400s for corresponding features.

As shown in FIG. 13, in some embodiments, the irrigation post 408 may have a broadened geometry. This may, in some such embodiments, allow for the placement of irrigation apertures 414 in locations that would otherwise be unreachable using a round or tubular irrigation post 108. In some other embodiments, the irrigation post 408 may have a shovel-head like shape, providing a pointed lower portion to aid installation while also providing a broad lateral surface that irrigation apertures 414 can be included within.

II. Modular Root Irrigation Spike Apparatus

In some use cases, it may be advantageous for a user to be able to adapt the root irrigation spike apparatus of the present disclosure to meet different system needs. As a non-limiting example, it may be necessary to reach varying depths beneath the surface for effective root irrigation or there may be different sizes and thicknesses of irrigation lines being used. As such, some aspects of the present disclosure are directed to modular variations of the root irrigation spike apparatus described above. Further understanding of such modular embodiments can be had by reference to FIG. 14.

Figure 14:
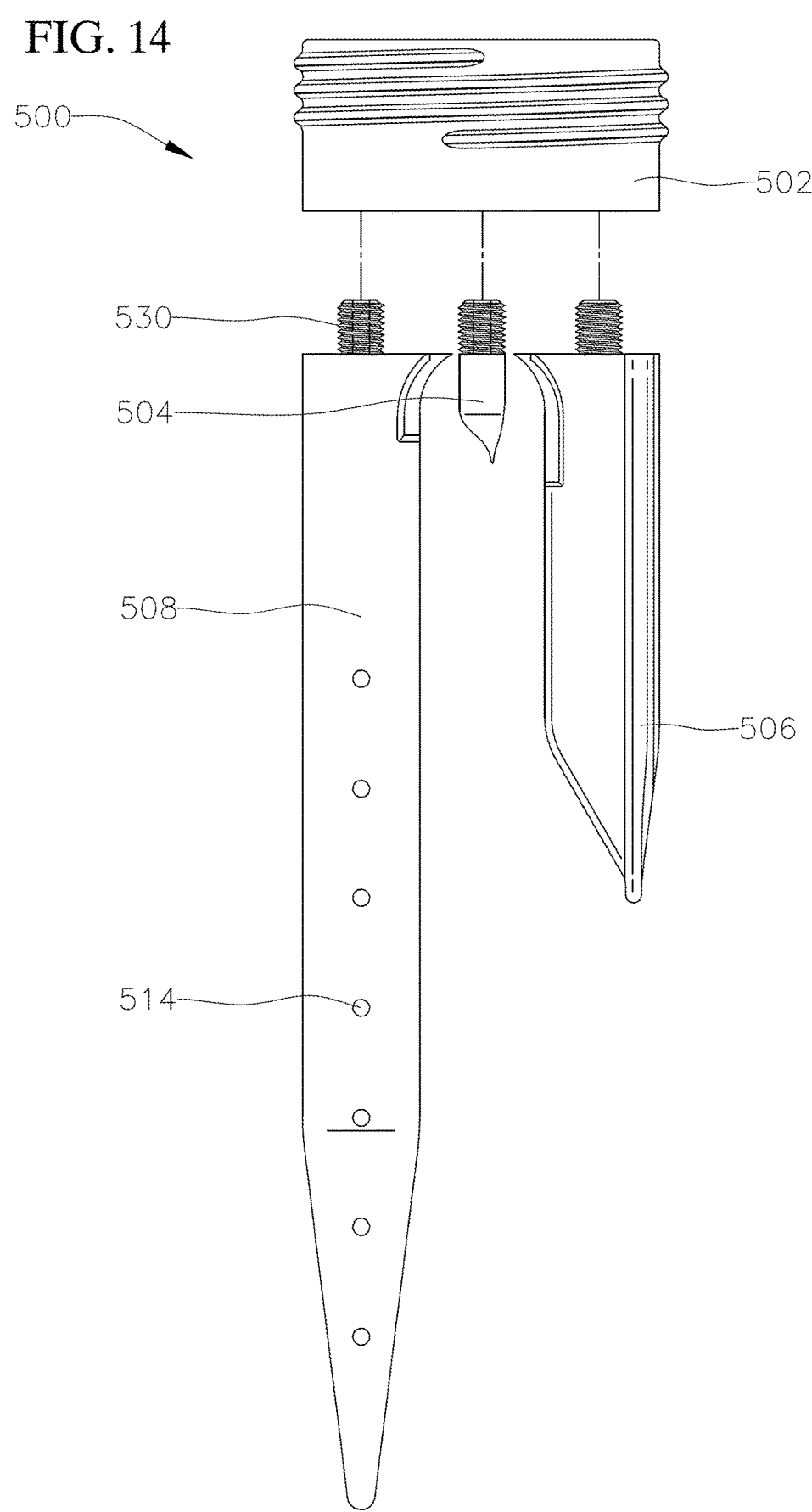
FIG. 14 is a frontal view of a modular root irrigation spike apparatus, according to some aspects of embodiments of the present disclosure.

FIG. 14 is a frontal view of a modular root irrigation spike apparatus 500, according to some aspects of embodiments of the present disclosure. As depicted, some embodiments of the modular root irrigation spike apparatus 500 may include a modular central body 502. In some such embodiments, the modular central body 502 may include a plurality of attachment points (not shown) along its bottom surface. The other features of the central body 102 described previously are applicable to the modular central body 502 and are within the scope of the modular central body 502.

The attachment points may, in some embodiments, be located within the bottom surface of the modular central body 502 in positions corresponding to the locations of the irrigation post 108, the self-piercing needle portion 104, and the stabilizing post 106 as described above for the root irrigation spike apparatus 100. However, other positions for the attachment points are within the scope of the present disclosure. In some embodiments, the attachment points may include one or more openings that may be configured to permit fluid flow. In some other embodiments, the attachment points may include one or more connecting structures (not shown). The connecting structures may, in some embodiments, allow for the secure coupling of another component, having a suitable connector (described more below), that has a structure that interfaces with the connecting structure. As a non-limiting example, the connecting structure may include threads, bayonet-type locks, grooves, flanges, recesses, and any other structures as would be known by one skilled in the art to be suitable for this purpose. In some other embodiments, an adhesive or epoxy may be used to securely couple the modular components to the one or more attachment points.

In some embodiments, the attachment points may be configured to allow for a continuous channel to be formed between a coupled modular component (and its connector) and the chamber of the modular central body 502. Such embodiments may facilitate the operation of the modular apparatus as described above for the root irrigation spike apparatus 100 after the modular components have been selected and coupled to the modular central body 502.

A connector 530 may, in some embodiments, be included with any or all of a modular self-piercing needle portion 504, a modular irrigation post 508, and a modular stabilizing post 506. As a non-limiting example, the connector may, in some embodiments, be formed by a tube with an outer surface that has one or more structures that correspond to the connecting structure of the attachment points. Thus, for attachment points having threads as a connecting structure, the corresponding connector 530 may include a tube having a threaded outer surface configured to mate with the threads of the connecting structure and thereby securely couple to the attachment point.

Connectors 530 having a tubular shape may, in some embodiments, allow for the creation of a communicable channel between the coupled modular component and the chamber of the modular central body 502. As a non-limiting example, the tubular connector 530 of a self-piercing needle portion 504 may form a continuous channel between the lumen of the self-piercing needle portion 504 and the chamber of the central body 502. Similarly, a tubular connector 530 of an irrigation post 508 may for a communicable channel between the interior of the irrigation post 508 and the chamber of the central body 502 such that fluid may be delivered to the irrigation apertures 514.

For modular components that do not need to permit fluid flow, such as some embodiments of the stabilizing post 506, the connector 530 may be tubular or solid.

As will be appreciated by one skilled in the art, the internal geometry of the connector 530 and the size of any passages through the connector 530 (as in the case of a tubular connector 530), may be varied according to user need. All suitable shaped and sizes of such passages as would be known to one skilled in the art are within the scope of the present disclosure.

Some embodiments of the modular root irrigation spike apparatus 500 may allow for a user to select and securely couple one or more modular components, i.e., the modular irrigation post 508, the modular self-piercing needle portion 504, and the modular stabilizing post 506, by interfacing the connecting structures of the attachment points with the corresponding structures of the connectors 530 of the selected modular components. This may, as a non-limiting example, allow for a user to select a different self-piercing needle portion geometry and size configured to work with different irrigation line compositions and/or sizes/thicknesses. Likewise, some embodiments of the modular irrigation post 508 may have different dimensions allowing for a user to select a size that, for example, reaches a required sub-surface depth for fluid delivery.

As will be appreciated by one skilled in the art, all of the previously described features of the non-modular embodiments of the present disclosures (apparatuses 100, 200, 300, and 400) may be incorporated into embodiments of the modular root irrigation spike apparatus 500.

III. Method for Installation

The following steps may be included in a method for installing an embodiment of the root irrigation spike apparatus (100, 200, 300, 400, and 500) of the present disclosure. The steps described herein may be performed in any sequence, and some steps may be omitted as needed.

Figure 16:
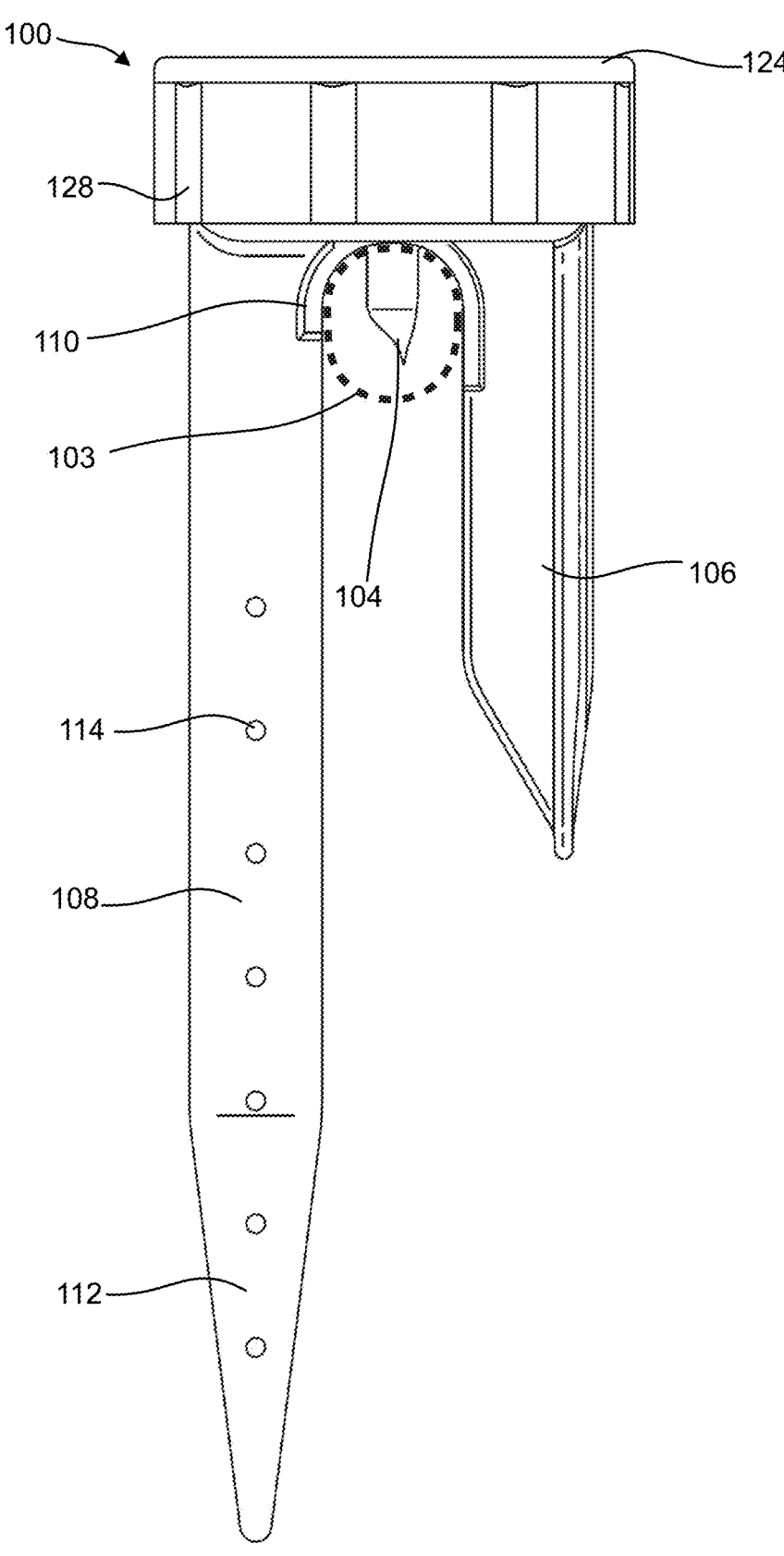
FIG. 16 is a front view of a root irrigation spike apparatus of FIG. 6 showing a a dotted line cross section of an irrigation line, according to some aspects of embodiments of the present disclosure.

A user may, in some embodiments, begin the method by selecting, along an irrigation line, an installation location for the root irrigation spike apparatus. Once a suitable installation location has been selected, the user may then, in some embodiments, proceed by placing, by the user, an emitter within an irrigation aperture of the irrigation post. The emitter may be placed within an irrigation aperture to more precisely control where in the sub-surface soil fluid will be delivered once the apparatus has been installed. Next, the method may proceed by piercing, using a self-piercing needle portion, the irrigation line and thereby communicably coupling the root irrigation apparatus to the irrigation line. (FIG. 16). After being communicably coupled to the irrigation line, the user may, in some embodiments, proceed by securing, using a line retainer, the irrigation line between an irrigation post and a stabilizing post of the root irrigation spike apparatus. Then, to place the irrigation apertures in a subterraneous location to deliver fluid to the roots of a plant, tree, or lawn, the user may position the apparatus by applying, by the user, a downward force to a lid on the root irrigation spike apparatus sufficient to drive the irrigation post and the stabilizer post into a subsurface volume of the installation location.

For use with embodiments of the modular root irrigation spike 500 of the present disclosure, in some embodiments of the method described above, a user may select one or more modular components corresponding to his or her use parameters and then securely couple the selected one or more modular components to the attachment points of the modular central body 502 by interfacing the connecting structure of the attachment points with the corresponding connectors 530 of the selected modular components.

In still other embodiments, the method of installation may begin with the user selecting a location along an irrigation line to receive additional fluid delivery. The user may then place the irrigation line between the irrigation post and the stabilization post of the root irrigation spike apparatus, i.e., "straddle" the irrigation line between the irrigation post and the stabilization post. Then the user may push the self-piercing needle portion into the irrigation line establishing a communicable connection between the apparatus and the line. (FIG. 16). Once connected, the user may push down on the lid to drive the apparatus down to its fully installed depth within the soil.

In some embodiments, the user may also adjust the flow rate of the apparatus by turning the lid in a direction corresponding to an increased or decreased fluid flow out of the opening formed by the lumen of the self-piercing needle portion 120 (also referred to herein as "inlet 120").

In some other embodiments, the user may couple a first end of a 90° fitting over the self-piercing needle portion and then interface a second end of the 90° fitting with an open end of an irrigation line. (FIG. 17). In some such embodiments, this may be an alternative step to pushing the self-piercing needle portion directly into the irrigation line.

It will be understood that embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claim. It should be noted that although examples of the invention are set forth herein, the claims, and the full scope of any equivalents, are what define the metes and bounds of the invention.

What is claimed is:

1. A root irrigation spike apparatus, comprising:
   a central body;
   a chamber traversing the central body;
   an irrigation post communicably coupled to the chamber having at least one irrigation aperture; and
   a self-piercing needle portion communicably coupled to the chamber having a tapered diameter, the self-piercing needle portion comprising a self-piercing needle, the self-piercing needle configured to communicably engage an irrigation line that delivers fluid to the self-piercing needle, the self-piercing needle portion including a lumen that forms a continuous path for the flow of water, from an interior of the irrigation line, up through the self-piercing needle portion, and into the chamber of the root irrigation spike apparatus;

wherein the self-piercing needle portion is parallel to and laterally offset from the irrigation post; and wherein the irrigation post is configured to be positioned pushed downward into a subsurface volume of an installation location of the root irrigation spike.

2. The root irrigation spike apparatus of claim 1, further comprising a stabilizing post, the stabilizing post spaced apart from the irrigation post.

3. The root irrigation spike apparatus of claim 2 wherein the root irrigation spike apparatus is configured to receive the irrigation line between the irrigation post and the stabilizing post.

4. The root irrigation spike apparatus of claim 3 wherein the root irrigation spike apparatus straddles the irrigation line as the self-piercing needle is moved into engagement with the irrigation line.

5. The root irrigation spike apparatus of claim 2 wherein the stabilizing post is positioned below the central body and opposite the irrigation post.

6. The root irrigation spike apparatus of claim 1, further comprising an irrigation line retainer.

7. The root irrigation spike apparatus of claim 6 wherein the self-piercing needle is configured to pierce the irrigation line as the irrigation line is moved into engagement with the irrigation line retainer.

8. The root irrigation spike apparatus of claim 1, wherein the central body comprises a threaded portion configured to mate to a lid.

9. The root irrigation spike apparatus of claim 8, wherein the lid comprises a grip enhancer.

10. The root irrigation spike apparatus of claim 1, wherein the irrigation post further comprises a pointed tip.

11. The root irrigation spike apparatus of claim 1, wherein the self-piercing needle portion comprises a retention shoulder.

12. The root irrigation spike apparatus of claim 1, wherein the irrigation post further comprises a stabilizer wing.

13. The root irrigation spike apparatus of claim 1 comprising a lid, the lid including a flow control post, and wherein an inlet forms a rim that extends inward into the chamber and around an opening of the lumen of the self-piercing needle portion, the inlet including a slot that extends upward within an inner surface of the inlet, and wherein a distal end of the flow control post interfaces with the inlet, and/or the inlet and the slot, to assist in varying or controlling fluid flow into the chamber.

14. The root irrigation spike apparatus of claim 1 wherein the irrigation line includes an elbow, the elbow having a first end connected to the irrigation line and a second end connected to the self-piercing needle.

15. The root irrigation spike apparatus of claim 1 wherein the self-piercing needle portion is configured to be positioned pushed downward into the irrigation line to communicably engage the irrigation line.

16. A modular root irrigation spike apparatus, comprising:

a central body comprising a plurality of attachment points;

a chamber traversing the central body;

a modular irrigation post having at least one irrigation aperture and configured to be coupled to the lower portion of the central body at one of the plurality of attachment points and thereby communicably link to the chamber; and a modular self-piercing needle portion configured to be coupled to the lower portion of the central body at one of the plurality of attachment points and thereby communicably link to the chamber, and the modular self-piercing needle portion further configured to engage the irrigation line to receive fluid delivered to the modular root irrigation spike apparatus by the irrigation line, the modular self-piercing needle configured to include a lumen that forms a continuous path for the flow of water, from an interior of the irrigation line, up through the self-piercing needle portion, and into the chamber of the module root irrigation spike apparatus;

wherein the self-piercing needle portion is parallel to and laterally offset from the irrigation post; and wherein the modular irrigation post is configured to be positioned pushed downward into a subsurface volume of an installation location of the modular root irrigation spike.

17. The modular root irrigation spike apparatus of claim 16, wherein the modular irrigation post comprises a connector configured to couple to one of the plurality of attachment points.

18. The modular root irrigation spike apparatus of claim 16, wherein the modular irrigation self-piercing needle portion comprises a connector configured to couple to one of the plurality of attachment points.

19. The modular root irrigation spike apparatus of claim 16, further comprising a modular stabilizing post comprising a connector configured to couple to one of the plurality of attachment points, the modular stabilizing post spaced apart from the modular irrigation post.

20. The modular root irrigation spike apparatus of claim 16, wherein the modular self-piercing needle portion comprises a retention shoulder.

21. The modular root irrigation spike apparatus of claim 16, wherein the modular irrigation post comprises a stabilizer wing.

22. The modular root irrigation spike apparatus of claim 16, further comprising a lid.

* * * * *